(12) United States Patent
Becker et al.

(10) Patent No.: US 7,746,987 B1
(45) Date of Patent: Jun. 29, 2010

(54) VOICE MESSAGE TRANSMISSION AND RETRIEVAL

(76) Inventors: Dennis Becker, 2130 Orinda Blvd., Cardiff, CA (US) 92007; Alex Shah, 4222 Cordobes Cove, San Diego, CA (US) 92130

( * ) Notice: Subject to any disclaimer, the term of this patent is extended or adjusted under 35 U.S.C. 154(b) by 0 days.

(21) Appl. No.: 12/758,009

(22) Filed: Apr. 11, 2010

(51) Int. Cl.
*H04M 1/64* (2006.01)

(52) U.S. Cl. ............... 379/88.12; 379/88.17; 379/88.26; 379/207.16; 455/466; 455/518; 709/223

(58) Field of Classification Search ............... 379/88.12, 379/88.17, 88.26, 207.16; 455/466, 518; 709/223
See application file for complete search history.

(56) References Cited

U.S. PATENT DOCUMENTS

| | | | |
|---|---|---|---|
| 6,987,980 B1 * | 1/2006 | Hans et al. .................. | 455/466 |
| 7,013,155 B1 | 3/2006 | Ruf et al. | |
| 7,085,357 B2 * | 8/2006 | Gavette et al. ........... | 379/88.12 |
| 7,092,497 B1 * | 8/2006 | Spielman et al. ......... | 379/88.12 |
| 7,130,390 B2 * | 10/2006 | Abburi .................... | 379/88.17 |
| 7,142,644 B2 * | 11/2006 | Lockwood ............... | 379/88.12 |
| 7,184,786 B2 | 2/2007 | Mumick et al. | |
| 7,308,081 B2 * | 12/2007 | Trandal et al. ........... | 379/88.12 |
| 7,400,713 B2 * | 7/2008 | Gao et al. ................. | 379/88.12 |
| 7,480,368 B2 * | 1/2009 | Sipher .................... | 379/88.12 |
| 7,492,872 B1 * | 2/2009 | Di Carlo et al. .......... | 379/88.12 |
| 7,624,171 B1 * | 11/2009 | Rodkey et al. ............. | 709/223 |
| 7,643,620 B1 * | 1/2010 | Goth et al. ............... | 379/88.12 |
| 7,672,439 B2 * | 3/2010 | Appelman et al. ..... | 379/207.16 |
| 7,684,815 B2 * | 3/2010 | Counts et al. ............... | 455/518 |

FOREIGN PATENT DOCUMENTS

WO WO 2009/122389 10/2009

* cited by examiner

*Primary Examiner*—Gerald Gauthier
(74) *Attorney, Agent, or Firm*—Clause Eight IPS; Michael Catania (57) ABSTRACT

A method and system for storing, transmitting and retrieving an audio message is disclosed herein. The invention allows a recipient to access a voice message sent by a sender by clicking on an access key in a SMS text sent to the recipient's phone. The SMS text preferably provides information on the sender and the length of the voice message. Once the recipient accesses the message, another SMS text is sent to the sender providing information on the when and how much of the voice message was communicated to the recipient. The voice message is preferably stored at a server of the system.

1 Claim, 8 Drawing Sheets

VOICE MESSAGE TRANSMISSION AND RETRIEVAL

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to telecommunications. More specifically, the present invention relates to voice messaging using a mobile communication device.

2. Description of the Related Art

Figure 8:
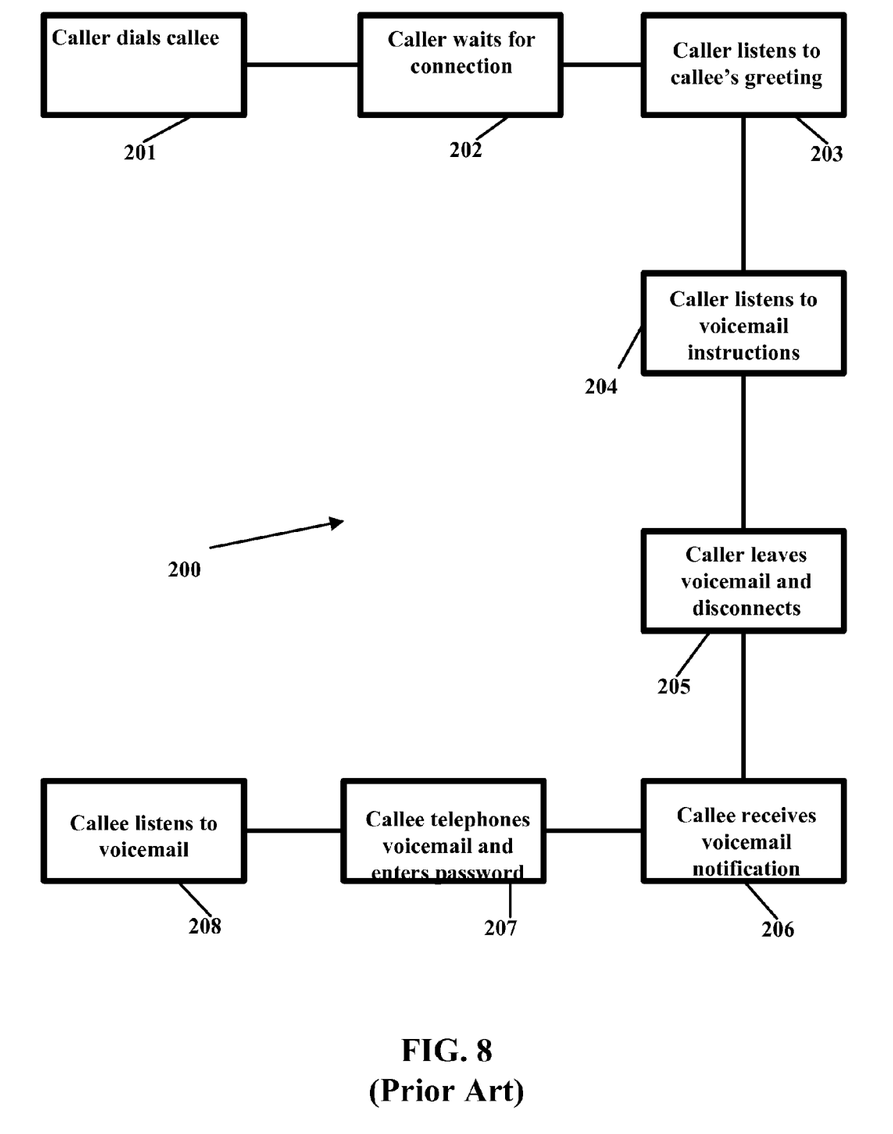
FIG. 8 is a flow chart for a method of the prior art for creating and storing a voicemail.

The prior art discusses various techniques for receiving voice mail. As shown in FIG. 8, a conventional method for creating and leaving a voice message for a recipient is generally designated 200. At block 201, a caller dials a telephone number for callee (the recipient). At block 202, the caller waits for the connection to the callee or the callee's voicemail system. At block 203, the caller listens to the callee's greeting. At block 204, the caller listens to the voicemail instructions for the callee's voicemail system. At block 205, the caller records the voicemail message on the callee's voicemail system and disconnects the telephone call. At block 206, the callee receives the voicemail notification, however, the callee does not know from whom the voicemail message was sent and how many voicemail messages may be stored in the callee's voicemail system. At block 207, the callee dials the callee's voicemail system and enters the callee's password to access the callee's voicemail system. At block 208, the callee finally listens to the voicemail message from the caller. The caller is unaware if the callee has received the voicemail message and if the callee listened to the entire voicemail message.

Various improvements to the conventional voicemail system have been proposed in the patent literature.

One example is Markport Limited, International Publication Number 2009/122389 for Voice Mail Processing which discloses a system that allows a user to access a voicemail message through a Short Message Service ("SMS") and circuit switched voice channel.

Another example is Ruf et al., U.S. Pat. No. 7,013,155 for Delivery Of An Instant Voice Message In A Wireless Network Using The SMS Protocol which discloses an interactive voice response system for a sender to use to send a voice message.

Yet another example is Mumick et al., U.S. Pat. No. 7,184,786 for Techniques For Combining Voice With Wireless Text Short Message Services which discloses combining speech with existing text wireless SMS to create a multimodal SMS service.

BRIEF SUMMARY OF THE INVENTION

One aspect of the present invention is a method for storing, transmitting and retrieving an audio message. The method includes accessing a recipient name and recipient telephone number from a contact list of a telephonic computing device of a sender. A preferred telephonic computing device is a smartphone. The method also includes creating an audio message from the telephonic computing device of the sender. The method also includes transmitting the audio message to a server over a wireless network. The method also includes receiving at the server the audio message for the recipient telephone number sent by the sender. The method also includes mapping an audio file number to the audio message. The method also includes storing the audio message in a database at the server. The method also includes transmitting a SMS to the recipient telephone number, the SMS comprising a response to access the audio message in the database at the server based on the audio file number, the SMS also comprising a name of the sender, a telephone number of the sender and a length of the audio message. The method also includes receiving the single character response to access to the audio message in the database at the server. The method also includes telephoning the recipient telephone number with a call from the server. The method also includes confirming an answer at the recipient telephone number in response to the call from the server. The method also includes transmitting the audio message to the recipient telephone number upon confirmation from the recipient telephone number. The method also includes transmitting a delivery receipt SMS to the sender, the delivery receipt comprising the time of the delivery of the audio message to the recipient and the percent of the audio message played for the recipient prior to a disconnection of the call from the server.

In a most preferred embodiment, the invention also encompasses not only the receipt feature notifying the sender that the recipient has received the message, but also another feature that allows the recipient to instantly reply to the sender. After hearing the audio message the recipient is prompted with "to reply to this message, hit the # key" (or some other message). If the recipient hits the # key then the recipient is prompted to leave a message that is sent back to the sender via SMS in the same fashion the recipient received the first message from the sender.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
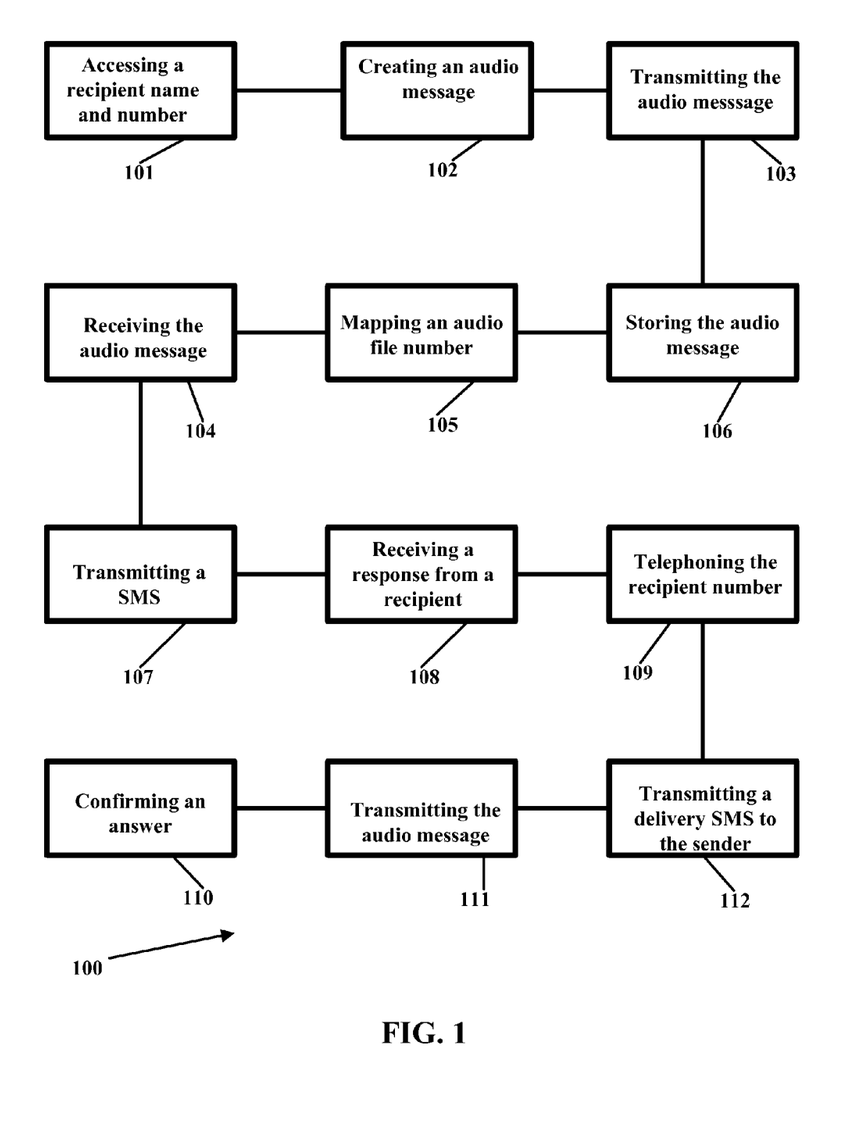
FIG. 1 is a flow chart of a general method of the present invention.

As shown in FIG. 1, a method of the present invention is generally designated 100. At block 101, a sender accesses a recipient's name and telephone number from a contact list on the sender's telephonic computing device. The system of the present invention retrieves the first and last name, and the mobile phone number of the recipient from the phone contact Application Programming Interface ("API"). The sender's first and last name, and phone number are retrieved through the phone API or prompted upon first use of the client application, and are sent to the service of the system. For system to operate properly, the server preferably requires the name and phone number of both the recipient and the sender. Software Development Kits (SDKs) for mobile phones are not standardized. Phones that include an API for third party development, return contact information in records that include First Name, Last Name, Company Name, and multiple sub-records for phone numbers, addresses, email, IM, Twitter, Notes, profile image thumbnails, etc. The types of phones can be mobile, home, office, or others. Such preferred telephonic computing devices include the IPHONE® smartphone from Apple, Inc., BLACKBERRY® smartphones from Research In Motion, the ANDROID® smartphone from Google, Inc., the TRE® smartphone from Palm, Inc., and many more. At block 102, the sender creates an audio message by accessing an application software on the sender's telephonic computing device and recording the audio message into a microphone of the telephonic computing device. The message is preferably recorded using the Audio SDK provided by the phone, recording through the microphone, and then the encoded binary sound file is transferred to the server over the wireless network, and through the Internet. An alternative mechanism, supported by almost any mobile phone, has the sender send the contact information of the recipient to a short code (over MMS/SMS). Most mobile phones support a standard called vCard (.vcf) when sending contact information in a text message. After receiving the contact information of the person (via txt msg), the service of the system then calls the mobile phone of the sender, and asks him or her to record a message. At block 103, the audio message is transmitted over a wireless network to a server.

At block 104, the server receives the audio message from the sender. The underlying protocol at the server 35 is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. Essentially any protocol is used that is designed for transmission of media files. The transmission protocol is preferably an audio binary file (.caf) sent over HTTP. As described above, the audio file is preferably received by calling the mobile phone directly, after receiving contact information (.vcf) over multimedia message. The protocol at the server is preferably HTTP. However, in the alternative, for a legacy mobile phone mechanism, the protocol is dependent on the phone carrier for transmitting audio content, since the service of the system is calling the sender's phone and prompting the sender's phone for the message. At block 105, the server maps an audio file number to the audio message. The server 35 preferably uses the sender's telephone number, the recipient telephone number and a unique message identification to create a unique key to the message. For mapping an audio file to an audio message, an audio message is received and is given a unique identifier. The message is stored as a binary audio file on disk (typically .wav or .mp3). The unique identifier is stored in a database along with meta-information about the sender and recipient, such as the mobile phone number and name, the length of the message (in seconds—12.3 seconds, for example), queue position (1, 2, 3, . . . 10). For each message being stored for a recipient, the queue position in incremented. In the preferred implementation, if the end-user calls a DID directly instead of replying to the text message, then the system maps the DID called to a queue position. For example 858.555.1200=>queue pos #1, 858.555.1201=>queue pos #2, etc. The recipient can also get their audio message by sending the system a text message, which triggers a call back with the audio message: when using the text message approach, the recipient is required to respond with the queue position specified by "play 1", "play 2", "play 3". At block 106, the server stores the audio message on a database. Preferably, a database record stores the Uniform Resource Locator ("URL") to a file location. For storing the audio message at the database, in a most preferred implementation, the database stores a reference to a binary audio file, encoded as .wav or .mp3. When a recipient asks the message to be played back, by sending a text message to the service of the system, the system looks up the message by using the "caller-id" or mobile phone number that the text message was sent from +the queue pos and calls back the mobile phone and plays back that message. Alternatively, if the recipient calls a system DID, then the DID is mapped to a queue pos+the caller id, to look up the audio message. Alternatively, a database stores the binary of a file. At block 107, the server transmits a SMS message to the recipient telephone number. The SMS preferably contains information on the name of the sender, the length (time) of message, and an access key to retrieve the message.

At block 108, the server receives a response from the recipient to the SMS message. For receiving the response to access to the audio message in the database at the server, the response preferably goes through the carrier's wireless network, and eventually triggers an HTTP from the carrier to the system, which communicates the text message content "play 1", and the caller id of the mobile phone that made the text message. These two bits of information are used to look up the message and the system calls the number and plays back the message. At block 109, the server telephones the recipient's telephone number. Preferably, the inbound request information is matched, including the recipient's telephone number and message content, and that information is used to retrieve the source audio file in the database. Then, a telephone call to the recipient is initiated using an Interactive Voice Response ("IVR") system. At block 110, the server confirms an answer to the telephone call. Preferably, an answering machine detection system detects if a human being is present and not a voicemail greeting. The IVR system sends a message to the server indicating that a human being is present on the telephone call. For confirmation, the audio message sent to the sender's mobile phone will have the form "[Recipient name] listened to your 12.3 second voice message (sent at [date and time]) at [date and time]". At block 111, the server plays the audio message for the recipient. Preferably, the audio message is played via an IVR system. Alternatively, the audio message is place using another telephonic media platform designed to send and receive telephone calls and play media content to both parties during a telephone call. The source audio format of the audio message is preferably any supported IVR or other media format including MP#, .WAV., or others. At block 112, the server transmits a delivery SMS message to the sender with information concerning the time of delivery of the audio message to the recipient and the percent of the audio message listened to by the recipient. Preferably, the SMS message is sent using standard SMS protocols used by wireless carriers. Alternatively, an application message is transmitted to the sender's telephone using normal data protocols such as TCP/IP. The SMS message sent to the sender's mobile phone will have the form "[Recipient name] listened to your 12.3 second voice message (sent at [date and time]) at [date and time]".

Figure 2:
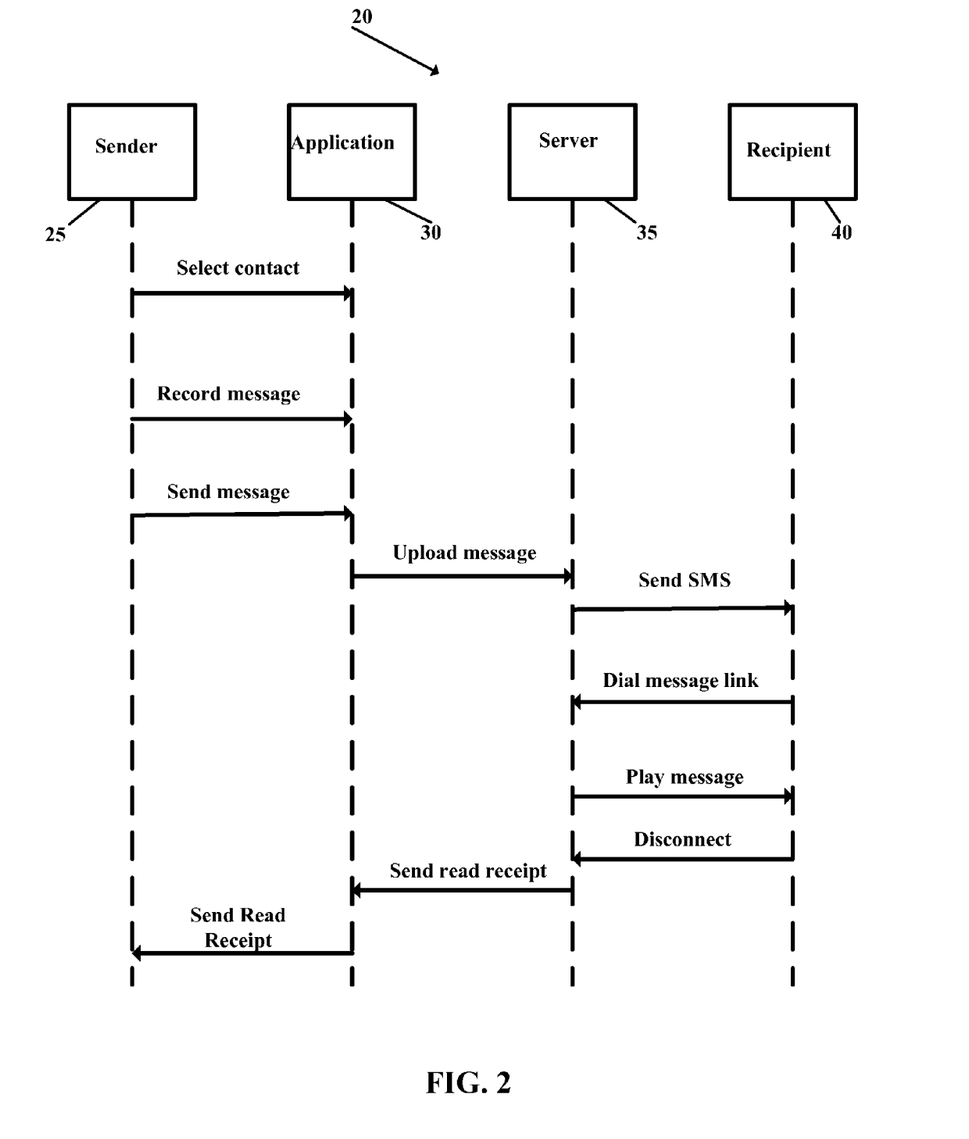
FIG. 2 is a flow chart of an architecture of the present invention.

FIG. 2 illustrates a block diagram of the architecture of the present invention. The architecture of the system 20 includes a sender 25, an application on the sender's telephonic computing device 30, a server 35 and a recipient's telephone 40. The sender 25 selects a contact from the sender's contact list on the sender's telephonic computing device and accesses the application software 30. The sender 25 records an audio message into a microphone of the sender's telephonic computing device using the application software 30. The sender 25 sends the audio message using the application software 30. The application software 30 uploads the audio message to the server 35. The server 35 sends a SMS message to the telephone of the recipient 40. The recipient 40 responds to the SMS message and clicks the access key to retrieve the audio message from the server 35. The server 35 plays the audio message for the recipient 40. The recipient 40 disconnects the telephone connection from the server 35. The server 35 sends a SMS read receipt message to the application software 30, which sends the SMS read receipt message to the sender 25.

The application software 30 is preferably uploaded to the sender's telephonic computing device over a wireless network. The application software 30 communicates with the server 35 to facilitate the storage, transmission and retrieval of audio messages. The sender 25 interacts with the application software 30 on the telephonic computing device of the sender 25 to select a target contact, record an audio message and send the message to the recipient 40. The recipient 40 does not need to have the application software 40 on the recipient's telephone. The recipient's telephone only preferably needs to have SMS capability.

The server 35 preferably stores and manages audio messages sent by senders using the application software 30 on each sender's telephonic computing device. In an alternative embodiment, the server preferably uses an association table to correlate E.164 numbers to audio messages. For example, utilizing the North American Number Plan (NANP) numbers for dial-in access to audio messages, a table such as Table One, would map the audio files to NANP numbers (also referred to as DIDs) for retrieval by the server for playing for a recipient 40.

TABLE ONE

| Sender | Recipient | DID | Message |
| --- | --- | --- | --- |
| 619-555-1234 | 619-444-5555 | 619-333-9876 | Vlipit.com/laudio/message.mp3 |
| 310-777-5555 | 818-555-1234 | 619-333-9876 | Vlipit.com/audio/messag1.mp3 |
| 503-999-8888 | 541-688-5555 | 619-333-9876 | Vlipit.com/audio/messag2.mp3 |

The same DID may be utilized for multiple recipients since the system 20 would recognize a caller ID of the recipient 40 dialing the DID to retrieve the audio message and only play the associated audio massage for the intended recipient. Specifically, the server 35 receives the telephone call to the DID. The server 35 examines the callerID of the caller. The server 35 searches for the DID in the table to find an audio message where there is a match for the called DID and the recipient callerID. The server 35 then plays the audio message for the caller/recipient 40.

The present invention provides an easier method for sending an audio message to a recipient and provides the sender with confirmation of the receipt of the audio message and what percent of the message was listened to by the recipient.

Figure 3:
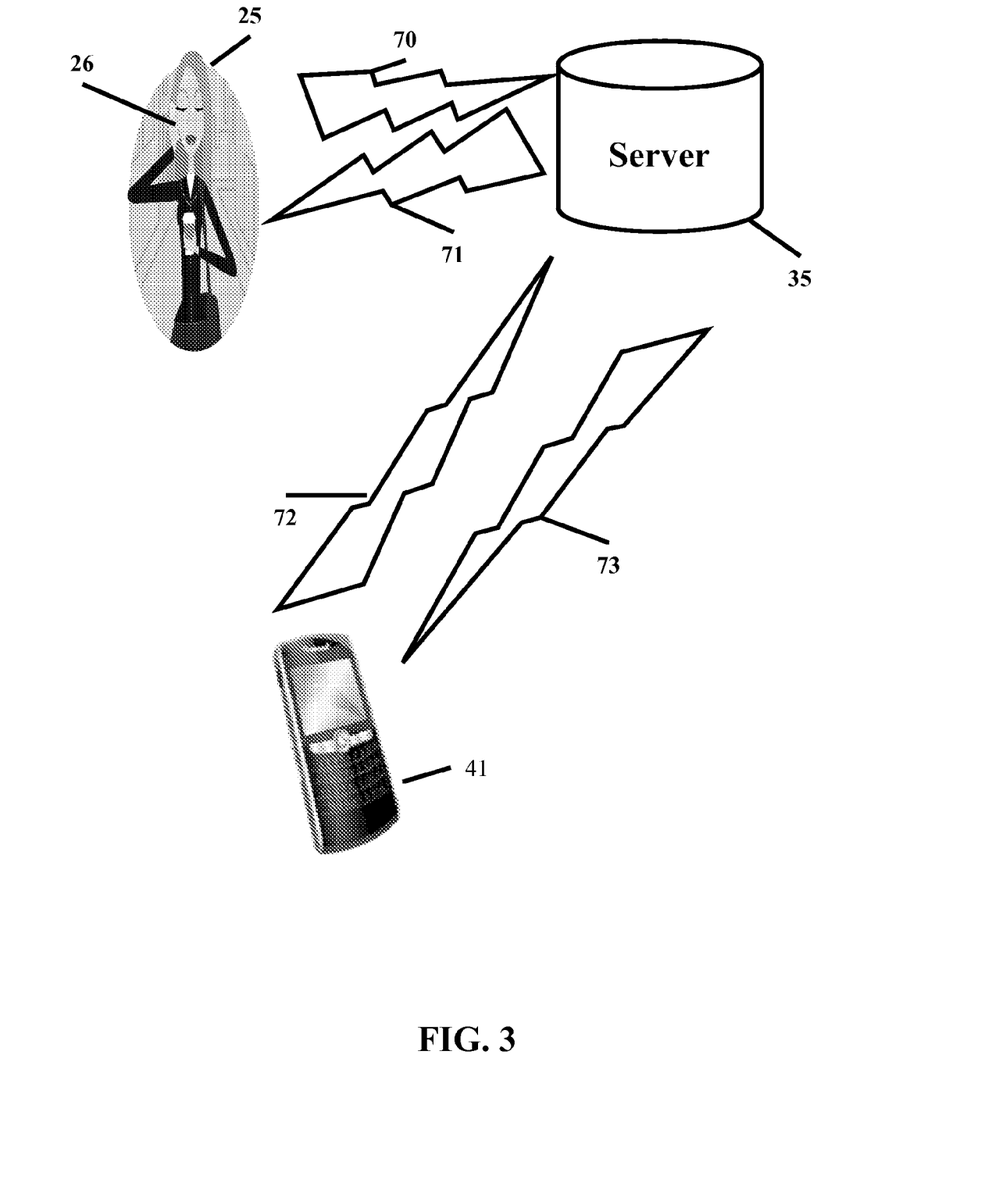
FIG. 3 is a schematic diagram of a system of the present invention.
Figure 4:
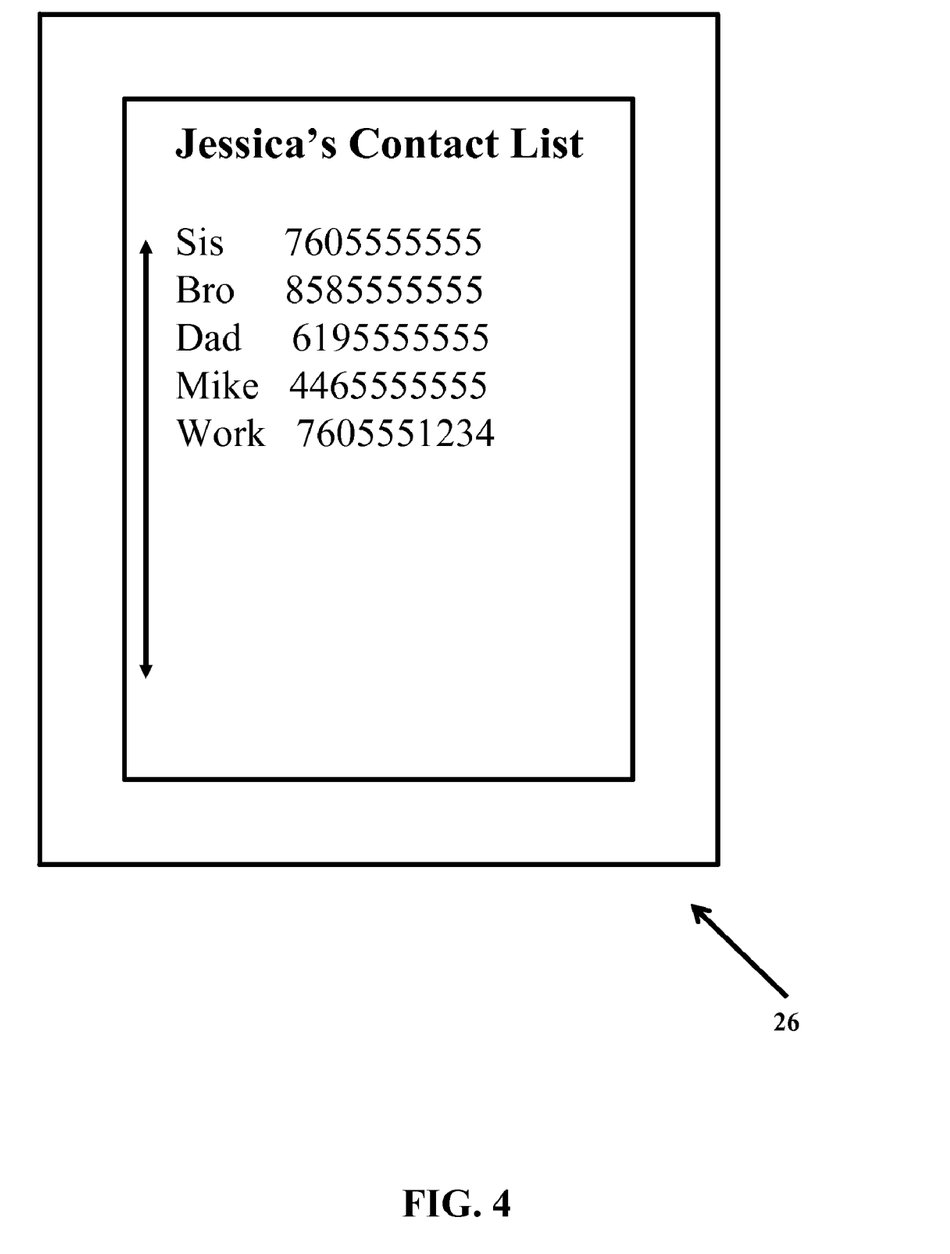
FIG. 4 is an isolated view of a sender's mobile phone illustrating the sender's contact list.
Figure 5:
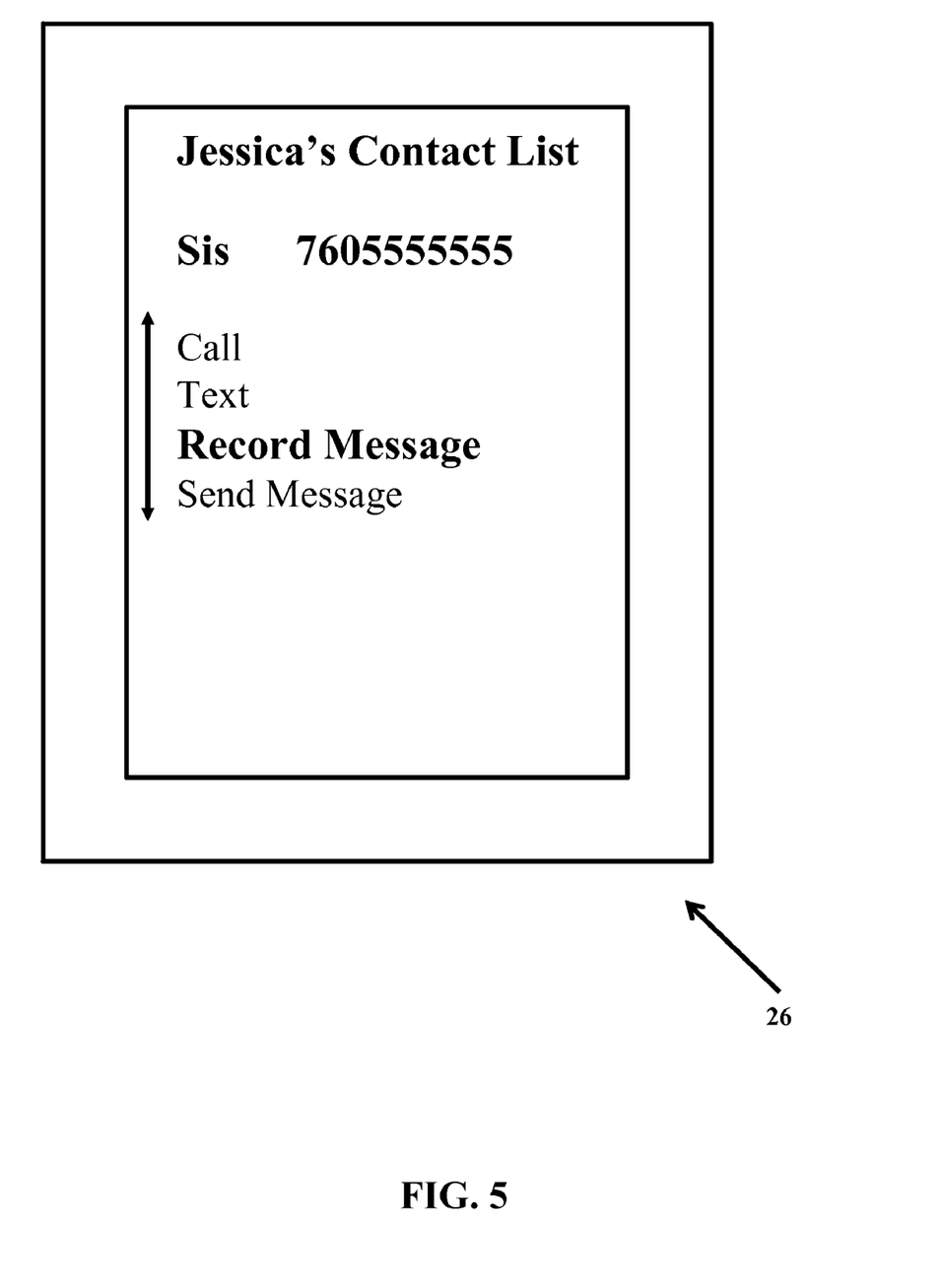
FIG. 5 is an isolated view of a sender's mobile phone illustrating a selected contact.
Figure 6:
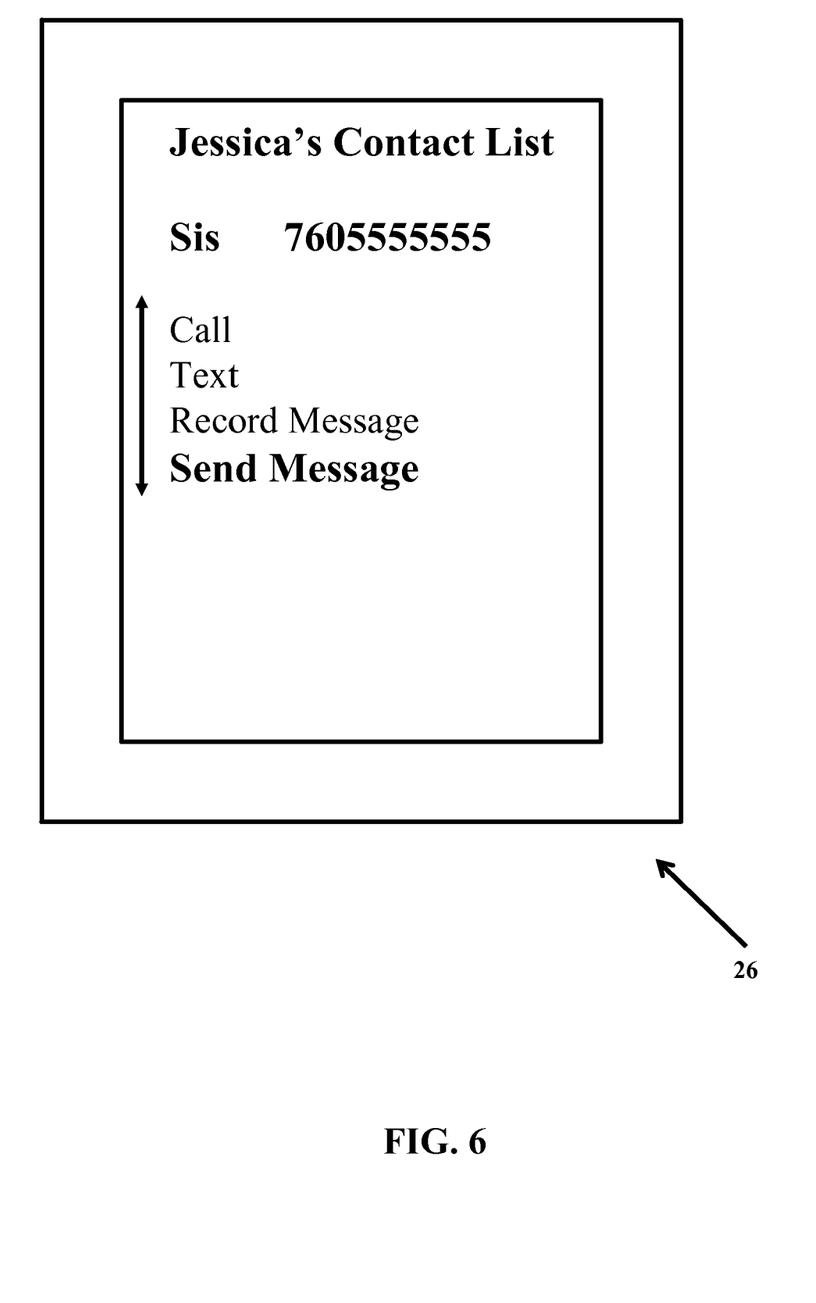
FIG. 6 is an isolated view of a sender's mobile phone illustrating a selected contact.
Figure 7:
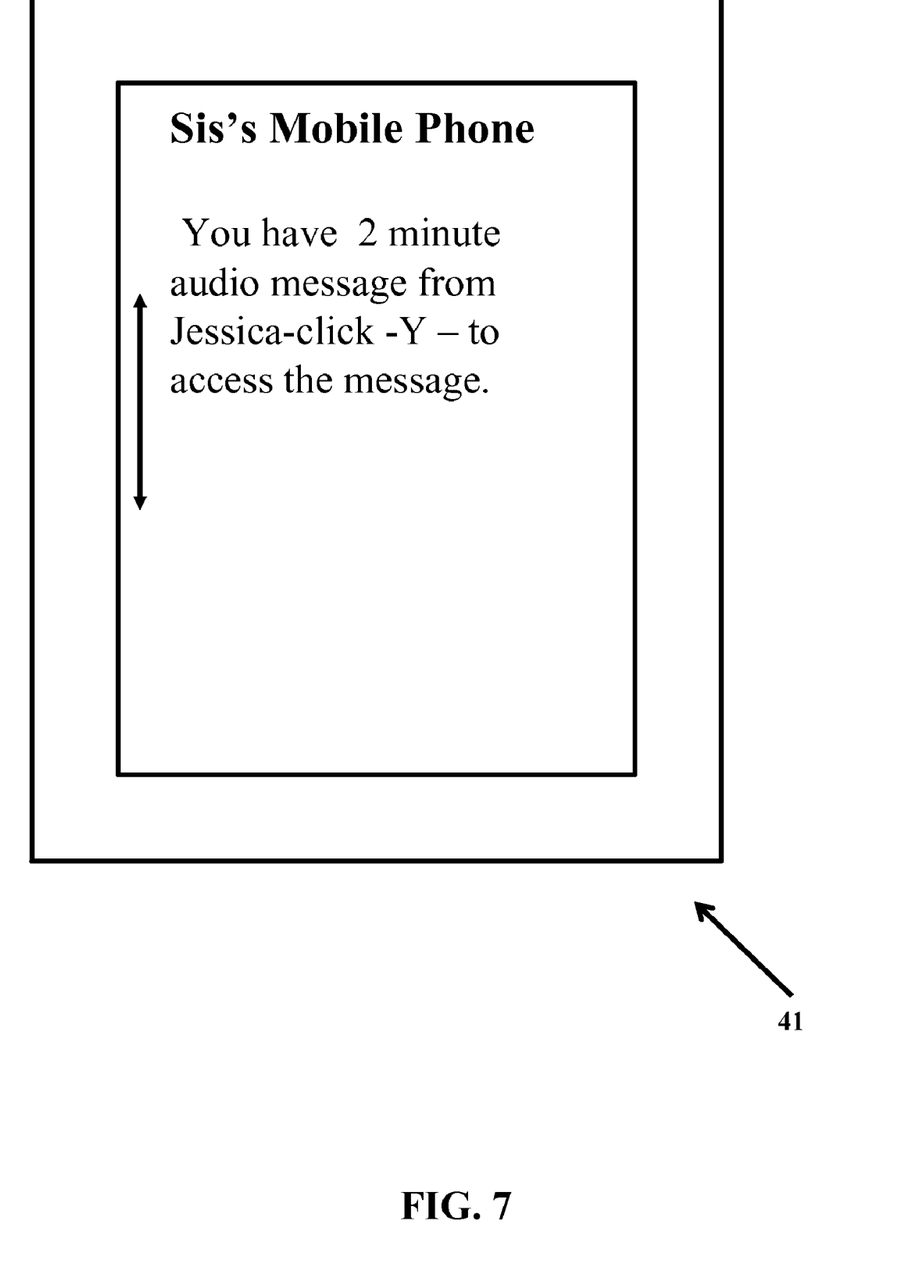
FIG. 7 is an isolated view of a recipient's mobile phone illustrating a SMS message.

For example, as shown in FIG. 3, a sender 25 named Jessica wants to send an audio message to her sister. Jessica accesses the application 40 on her telephonic computing device 26 and then accesses the contact list on her telephonic computing device 26 as shown in FIG. 4 to find her intended recipient. As shown in FIG. 5, Jessica scrolls down the list of menu choices and selects Record Message. Jessica then records her audio message by speaking into a microphone of her telephonic computing device. As shown in FIG. 6, Jessica then selects Send Message and the application 40 sends the audio message over a wireless network to the server 35 as shown by transmission 70. The server 35 maps an audio file number to the audio message and stores the audio message. The server 35 then sends a SMS message, as shown by transmission 73 to a phone 41 of the intended recipient. As shown in FIG. 7, on a display of the recipient's phone 41, the SMS message states that the recipient has an audio message from Jessica that is two minutes in length of time and that the recipient can access the audio message by clicking on the letter Y in the message. The recipient 40, Jessica's sister, clicks on the letter Y and is connected to the server 35 as shown by transmission 72 in FIG. 3. The server 35 verifies the audio message for the recipient 40 and plays the audio message for the recipient 40. The server 35 then sends a SMS delivery receipt to Jessica notifying her that her sister heard her message, at what time her sister heard her audio message and what percent of the audio message was listened to by her sister.

In a most preferred embodiment, the invention also encompasses not only the receipt feature notifying the sender that the recipient has received the message, but also another feature that allows the recipient to instantly reply to the sender. After hearing the audio message the recipient is prompted with "to reply to this message, hit the # key" (or some other message). If the recipient hits the # key then the recipient is prompted to leave a message that is sent back to the sender via SMS in the same fashion the recipient received the first message from the sender.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for storing, transmitting and retrieving an audio message, the method comprising:

accessing a recipient name and recipient telephone number from a contact list of a smartphone of a sender;

creating an audio message from the smartphone of the sender;

transmitting the audio message to a server over a wireless network;

receiving at the server the audio message for the recipient telephone number sent by the sender;

mapping an audio file number to the audio message;

storing the audio message in a database at the server;

transmitting a SMS to the recipient telephone number, the SMS comprising a character response to access the audio message in the database at the server based on the audio file number, the SMS also comprising a name of the sender, a telephone number of the sender and a length of the audio message;

receiving the character response to access to the audio message in the database at the server;

telephoning the recipient telephone number with a call from the server;

confirming an answer at the recipient telephone number in response to the call from the server;

transmitting the audio message to the recipient telephone number upon confirmation from the recipient telephone number; and transmitting a delivery receipt SMS to the sender, the delivery receipt comprising the time of the delivery of the audio message to the recipient and the percent of the audio message played for the recipient prior to a disconnection of the call from the server.

* * * * *